United States Patent [19]

Czepel et al.

[11] 4,369,286

[45] Jan. 18, 1983

[54] MODIFIED AMINOPLAST RESINS CONTAINING METHYLOLMELAMINE ETHERIFIED WITH A MONOALCOHOL AS MODIFIER

[75] Inventors: Hubert Czepel; Friedl Heger; Wilhelm Dobramysl, all of Linz, Austria

[73] Assignee: Chemie Linz Aktiengesellschaft, Linz, Austria

[21] Appl. No.: 317,830

[22] Filed: Nov. 3, 1981

[30] Foreign Application Priority Data

Nov. 24, 1980 [DE] Fed. Rep. of Germany ....... 3044151

[51] Int. Cl.$^3$ .............................................. C08L 61/32
[52] U.S. Cl. ..................................... 524/598; 428/530; 525/515; 528/254; 528/256
[58] Field of Search ................ 528/254, 256; 524/598; 525/515; 260/29.4 R

[56] References Cited

U.S. PATENT DOCUMENTS 3,936,547 2/1976 Schnee et al. ...................... 427/390
4,143,016 3/1979 Hönel et al. ......................... 528/254

FOREIGN PATENT DOCUMENTS 2536978 3/1977 Fed. Rep. of Germany .
1284280 8/1972 United Kingdom .

*Primary Examiner*—Theodore E. Pertilla
*Attorney, Agent, or Firm*—Mark Dryer

[57] ABSTRACT

Modified aminoplast resins based on melamine and formaldehyde or urea and formaldehyde, which contain, as modifiers, methylolmelamines having a molar ratio of melamine to formaldehyde of 1:3 to 1:6, which are etherified with mono-alcohols having 1 to 4 carbon atoms, in a ratio of melamine to alcohol of 1:2 to 1:6. These resins are used, in particular, for the production of decorative, glossy-surface laminations.

3 Claims, No Drawings

MODIFIED AMINOPLAST RESINS CONTAINING METHYLOLMELAMINE ETHERIFIED WITH A MONOALCOHOL AS MODIFIER

BACKGROUND OF THE INVENTION

The present invention relates to modified amino-plast resins based on melamine or urea and formaldehyde, which are employed for surface coating and which, in addition to the conventional additives, contain, as modifiers, methylolmelamines etherified with monoalcohols containing 1 to 4 carbon atoms.

Aminoplast resins, especially melamine-formaldehyde resins, are particularly distinguished by great hardness, scratch resistance, absence of color, transparency, high gloss and great resistance to hot water and steam and to numerous chemicals. They are therefore used, in combination with fillers or carrier materials, for the production of compression-molding compositions and of decorative laminates. However, without the addition of modifiers they also have certain disadvantages in processing and in final properties, such as low flow during hardening, i.e., during processing, and a tendency to crazing after hardening, resulting from a natural brittleness due to the crosslinking process associated with the hardening.

DESCRIPTION OF THE PRIOR ART

In the past, a large number of more or less complex compounds usually have been employed as modifiers. Thus, for example, p-toluenesulfonamide, sorbitol, ethylene glycol and even sugar are used for the production of laminates, but in such large amounts (about 10% or more based on liquid impregnating resin), that whilst the processability or crazing resistance of the hardened product is improved, the hardness, chemical resistance and surface gloss are rendered. Examples of modifiers which are substantially more complex and hence also more difficult to prepare are those described in German Auslegeschrift No. 2,536,978 in 1979. These modifiers are mixtures of, for example, water-soluble monoaryl ethers of polyalkylene glycols with hydroxyalkyl acrylates and their polymers, which must be prepared in a nitrogen atmosphere, using azodiisobutyronitrile as the catalyst.

The modifiers prepared according to British Pat. No. 1,284,280 are substantially easier to prepare, whilst being very effective. They are compounds of melamine and formaldehyde which are formed in an anhydrous solvent having at least two alcoholic hydroxyl groups, for example, ethylene glycol, and/or react further with the solvent in a simple manner. They also have the advantage that they are more effective, i.e., that they can be used in smaller amounts (about 5%, based on liquid resin), than the majority of modifiers previously known. This reduces the above-mentioned adverse effect of such additives on the hardened aminoplast resins.

According to U.S. Pat. No. 3,936,547, (methanol)-etherified methylolmelamines are used, in place of the customary aminoplast resins, for the impregnation of sheeting intended for lamination to wood-based materials. Evidently, however, their gloss is worse than that of the customary aminoplast resins, even though the customary additives which interfere with gloss are absent; this is revealed by the fact that to achieve a high degree of gloss the addition of vinyl acetate is explicitly recommended.

It was all the more surprising to find that the addition of a small amount of such compounds to aminoplast resins which have been mixed with customary auxiliaries and fillers markedly improves the gloss of the resins.

SUMMARY OF THE INVENTION

Accordingly, the present invention provides a modified aminoplast resin based on melamine or urea and formaldehyde, which contains, as the modifier, a methylolmelamine having a molar ratio of melamine to formaldehyde of 1:3 to 1:6, which is etherified with a monoalcohol having a chain length of 1 to 4 carbon atoms, in a molar ratio of melamine to alcohol of 1:2 to 1:6.

The modifier compound may be prepared in a conventional manner in a two-step or even one-step process, the reaction between melamine and formaldehyde (methylolation) mostly being catalyzed by alkali and the reaction of the resulting intermediate with an alcohol (i.e., the etherification) always being catalyzed by acid. Such a method of preparation is described, for example, in German Auslegeschrift No. 2,309,334.

Fully etherified compounds of this type, if they are monomeric, have, for example, the following structural formula

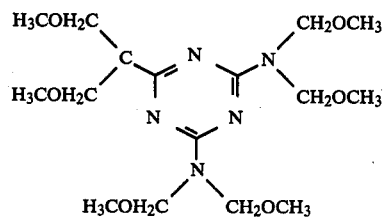

The compounds used as modifiers to the invention are substantially monomolecular or low-molecular substances. However, resinous components with higher molecular weights can not be ruled out as minor constituents of these mixtures.

The modifier is preferably added to the aminoplast resin in an amount of 0.5 to 5% by weight based on an aqueous solution of an aminoplast precondensate, of 50 to 65% by weight solids content, and it is a particular advantage that the modifier need not be added at the beginning of the preparation of the precondensate, as is necessary with various other modifiers. Rather, the modifier may be stirred into the finished precondensate batch without disadvantage. According to the invention, modifiers which have a molar ratio of melamine:formaldehyde:alcohol of 1:(4 to 5.5):(2 to 4) are preferred because they particularly improve the gloss.

A higher proportion of modifier than 5% does not interfere with the modifying effect, but is only justifiable for special applications (for example, postforming).

Amongst the alcohols used to etherify the methylolmelamines, methanol is particularly preferred, because of the high gloss achievable therewith.

The modifiers according to the invention are readily soluble in aqueous aminoplast precondensate solutions, with the exception of the fully etherified pentamethylolmelamines and hexamethylolmelamines which, however, also may be dissolved if a lower alcohol is present in the precondensate.

The modifiers according to the invention act as elasticizing agents on aminoplast resins and also as powerful flow assistants in processing, and this enables the resin to reproduce any given surface particularly uniformly (dependent on the press plate or press mold). In addition to having good resistance to acids, hot water and steam, resins modified in this way also show a markedly increased gloss compared to resins modified with conventional agents.

The modifiers according to the invention may be used in particular for the production of decorative laminates based on melamine-formaldehyde resin, for example, by pressing a suitable impregnated substrate, particularly layers of paper, impregnated with melamine-formaldehyde resin, either by the multi-daylight press process, using re-cooling, or by the short-cycle press process, without re-cooling. The first process a priori gives relatively glossy surfaces. In the second process the gloss of the surface produced is less, because there is no re-cooling.

Thus, the modifier according to the invention, is particularly important for use in resins which are pressed by the short-cycle process, since a substantial improvement in gloss and a "calmer", uniform surface are achieved thereby.

Accordingly, the invention also provides a process for the preparation of a decorative, glossy-surface laminate which comprises impregnating a substrate with a modified aminoplast resin as described above and subjecting the impregnated substrate to a short-cycle pressing process, without re-cooling.

Because of the good flow of the resins modified according to the invention, it is possible to laminate chipboard or similar board made from other materials having limited compressive strength, for example, resin-bonded vermiculite board, with melamine resin-impregnated or urea resin-impregnated papers, using very low press pressures (about 7 bar instead of the usual 20 to 30 bar). The lamination consequently may be made substantially more economical by using considerably cheaper presses.

However, the modifiers according to the invention, are in no way restricted to this possible method of processing, that is to say they equally may be used for the preparation of melamine-formaldehyde or urea-formaldehyde compression-molding compositions. The aminoplast precondensates are prepared in the usual manner, that is to say it is unnecessary to adapt their method of preparation in any way to the modifiers according to the invention.

DESCRIPTION OF THE PREFERRED EMBODIMENTS

The following Examples illustrate the invention.

EXAMPLE 1

Preparation of Melamine Resin Compression-Molding Compositions

A melamine-formaldehyde precondensate having a formaldehyde/melamine molar ratio of 2 is prepared from 980 g of melamine and 1,282 g of aqueous 36.4%-strength formaldehyde solution by condensation at a temperature of 90° C. and a pH of 8.2 until the water-dilutability is 1:0.5 (in parts by weight, at 20° C.). The final pH is adjusted to 9.0.

To prepare a compression-molding composition, the following substances are mixed in a kneader for 1 hour at 40° C.:500 g of melamine-formaldehyde resin (prepared as above), 162.3 g of cellulose powder, 21.6 g of titanium dioxide, 1.1 g of zinc stearate, 0.14 g of phthalic anhydride and 15.15 g of methyl-etherified methylolmelamine having a molar ratio of melamine:formaldehyde:MeOH = 1:4.9:2.2 (3% of this product, relative to the liquid resin).

The above mixture is dried to a residual moisture content of about 2.6% in vacuo at 80° C., and is milled. The resulting powdery compression-molding composition is tested for its processability on a Brabender Plasticorder at 130° C. kneader temperature. The following values are obtained:
Processing time: 2.4 minutes
Minimum torque (as a measure of the flow): 17.7 kN.m

EXAMPLE 2

Preparation of Urea Resin Compression-Molding Compositions

A urea-formaldehyde precondensate (molar ratio formaldehyde/urea = 1.85) is prepared as follows: 1,320 g. of formurea (composed of 57% of formaldehyde, 23% of urea and 20% of water), 504 g. of urea, 75 g. of melamine, 180 ml. of water and 90 g. of concentrated aqueous ammonia solution are heated to 90° C., with stirring. After adding 60 ml. of water and condensing the mixture for 5 minutes at 90° C., the pH value is brought to 7 and condensation is continued until the water-dilutability is 1:2 (in parts by weight).

To prepare a compression-molding composition, the following substance are mixed in a kneader for 1 hour at 40° C.:500 g. of urea-formaldehyde resin, 162.3 g. of cellulose powder, 21.6 g. of titanium dioxide, 1.1 g. of zinc stearate, 7.0 g. of melamine phthalate and 13.5 g. of methyletherified methylolmelamine having a molar ratio of melamine:formaldehyde:MeOH of 1:4.9:2.2 (2.7% of this product, relative to liquid resin).

This composition is dried to a residual moisture content of 2.8% at 80° C., and is milled. The processing characteristics are tested on a Brabender Plasticorder giving a processing time of 2.5 minutes and a minimum torque of 13.7 kN.m.

EXAMPLE 3

A liquid melamine-formaldehyde resin having a formaldehyde/melamine molar ratio of 1.8, a solid resin content of 55.4% (after drying for 2 hours at 120° C.) and a degree of condensation corresponding to a water-dilutability of 1:1.4 (in parts by weight at 20° C.) is modified by adding 3% (relative to the liquid resin) of a commerically available methyl-etherified methylolmelamine, having a molar ratio of melamine:formaldehyde:MeOH = 1:6:5.5 (Cymel 300, from Cyanamid).

Furthermore, the customary auxiliaries for the preparation of resin-impregnated papers, such as wetting agents, releast agents and flow control agents, are added. The thus modified impregnating resin solution is adjusted to a cloud time (at 100° C.) of about 1.5 minutes by adding a latent hardener.

A white decorative paper weighing 80 g/m$^2$ is impregnated with this impregnating resin liquor on a laboratory impregnating apparatus (from PWA Unterkochen) and is dried in a circulating air drying oven to a residual moisture content of about 5% (this requiring 10 minutes at 160° C.). The final dry weight of the impregnated film is about 200 g/m$^2$. The thus impregnated paper was pressed on a laboratory press, at a press temperature of 160° C. and a pressure of about 20 bar, with a press time of one minute. The surface properties of the lamination conform to the requirements of DIN 68,765 and DIN 53,799. The surface of the laminated panels shows a uniform high gloss. Measurement of the gloss according to DIN 67,530, with a measuring angle of 20°, gives a value of 70%. The results of this Example and of the following Examples are shown in summary in the Table.

EXAMPLE 4

The procedure described in Example 3 was followed, but using, as the modifier, a commercially available methyletherified methylolmelamine having a molar ratio of melamine:formaldehyde:MeOH=1:3:3 (Prox 15763 from Protex). The surface properties of the lamination conform to the requirements of DIN 68,765 and DIN 53,799.

EXAMPLE 5

The procedure described in Example 3 was followed, except that a methyl-etherified methylolmelamine having a molar ratio of melamine:formaldehyde:MeOH=1:4.9:2.2 was used as the modifier.

The surface properties of the lamination conform to the requirements of DIN 68,765 and DIN 53,799.

TABLE

| Example No. | Molar ratio Melamine: formaldehyde: MeOH | Gloss (%) according to DIN 67,530, measuring angle 20° |
| --- | --- | --- |
| 3 | 1:6:5.5 | 70 |
| 4 | 1:3:3 | 70 |
| 5 | 1:4.9:2.2 | 100 |

EXAMPLE 6

Pressure Under Lower Pressure

Laminates prepared according to Example 5 were used.
(a) Vermiculite panels (Thermax fire-protection panel A) and
(b) chipboard panels (three-layer structure) were laminated on a laboratory press, at a press temperature of 160° C. and a pressure of 7 bar, with a press time of one minute. The surface properties of the lamination conform to the requirements of DIN 68,765 and DIN 53,799.

EXAMPLE 7

The procedure described in Example 3 was followed, except that the amount of modifier was reduced to 0.5% (relative to liquid resin).

The surface properties of the lamination conform to the requirements of DIN 68,765 and DIN 53,799.

EXAMPLE 8

The procedure described in Example 3 was followed, except that the amount of modifier was increased to 5% (relative to liquid resin).

The surface properties of the lamination conform to the requirements of DIN 68,765 and DIN 53,799.

EXAMPLE 9

Butyl-Etherified Methylolmelamine

The procedure described in Example 3 was followed, except that an n-butyl-etherified methylolmelamine having a molar ratio of melamine:formaldehyde:n-butyl=1:5.5:4.6 was used as the modifier.

The surface properties of the lamination conform to the requirements of DIN 68,765 and DIN 53,799.

The gloss, according to DIN 67,530 (measuring angle 20°), is 70%.

We claim:

1. A modified aminoplast resin based on melamine and formaldehyde or urea and formaldehyde, which contains, as the modifier, 0.5 to 5% by weight, relative to an aqueous solution of an aminoplast precondensate having a solids content of 50 to 65% by weight, of a methylolmelamine having a molar ratio of melamine to formaldehyde of 1:3 to 1:6, which is etherified with a mono-alcohol having a chain length of 1 to 4 carbon atoms, in a molar ratio of melamine to alcohol of 1:2 to 1:6.

2. A modified aminoplast resin according to claim 1, wherein the molar ratio of melamine:formaldehyde:alcohol in the modifier is 1:(4 to 5.5):(2 to 4).

3. A modified aminoplast resin according to claim 1, wherein the alcohol component of the modifier is methanol.

* * * * *

Disclaimer and Dedication 4,369,286.—*Hubert Czepel, Friedl Heger* and *Wilhelm Dobramysl,* Linz, Austria. MODIFIED AMINOPLAST RESINS CONTAINING METHYLOLMELAMINE ETHERIFIED WITH A MONOALCOHOL AS MODIFIER. Patent dated Jan. 18, 1983. Disclaimer and Dedication filed Sept. 10, 1984, by the assignee, *Chemie Linz Aktiengesellschaft.*

Hereby disclaims and dedicates to the Public the entire term of said patent.

[*Official Gazette December 11, 1984.*]